Patented Aug. 23, 1927.

1,640,161

UNITED STATES PATENT OFFICE.

MURAJI TORII, OF KAMAKURAGORI, JAPAN.

ALUMINO SOLDER.

No Drawing.   Application filed August 7, 1924. Serial No. 730,678.

This invention relates to an alloy for alumino-solder which contains 20–70% of zinc, 20–70% of tin, 5–35% of lead, 3–50% of cadmium, 1–5% of tin phosphide and 1–5% of magnesium; and its object is to obtain an excellent alloy for soldering an aluminium alloy (mainly duralumin) with the same or another aluminium alloy; metallic aluminium with metallic or an aluminium alloy; metallic aluminium with any any other metal etc. in an easy and safe manner so that the joints are either protected from chemical action in contact with air or water, or strongly resistable against the breaking action by accidental or other external forces.

Alumino-solder according to this invention contains the following constituents:

| | Per cent. |
|---|---|
| Zinc | 20–70 |
| Tin | 20–70 |
| Lead | 5–35 |
| Cadmium | 3–50 |
| Tin phosphide | 1–5 |
| Magnesium | 1–5 |

The preparation of the new soldering alloy may be as follows:

Heat a definite quantity of tin at 230° C. in a graphite crucible using a blast furnace and when fused, add a definite quantity of lead and tin phosphide and heat the mixture up to 330° C. Then add a required quantity of cadmium, and lastly add zinc and magnesium, the heating being continued at 420° C. until all the contents are perfectly fused. Then pour the fused alloy into a metallic mould without any flux, and make the fused mass solidify rapidly by pouring cold water over it when beginning to cool.

The method of using the aluminium solder thus obtained is the same as that in usual solder. For instance, a soldering iron somewhat larger than that of the usual dimension, is employed after the surfaces to be joined are previously polished with sand paper to remove rust.

In the case of soldering thick plates, either the joining surfaces of plates are heated and the solder applied, or the surfaces are covered with preheated solder, and then pressed together, while the joining surfaces are being heated by a soldering copper or iron. An electric iron is preferably used for the purpose.

Metallic aluminium has a property of being easily oxidized by heating, and therefore it is necessary that the soldering temperature must be as low as possible. It is also well known that at the heating parts of aluminium alloys, especially in such as duralumin, molecular constitution becomes brittle in high temperature. As the alumino-solder, according to this invention, has a melting point far lower than that of the known kinds as described, the solder is well suited for the purposes herein mentioned. The lead employed in this invention has the effect of increasing the malleability of the soldier, avoiding brittleness of the zinc therein, and due to this fact, very efficient results are obtained.

Besides the characteristic properties of the alumino-solder as above described, it has excellent properties as follows:

Lead and cadmium in the solder serve to facilitate the soldering operation by rendering the solder easily diffusible. Said ingredients also act to retain the heat at the joints due to their low degree of conductivity as compared with that of metallic aluminium. Besides, cadmium serves to promote the fusibility of the solder by its reacting with the alloy of lead and tin.

It is well known that an alloy containing zinc and tin becomes brittle after a time due to the comparatively large crystalline construction. This alumino-solder, however, has not such a defect owing to the presence of lead and cadmium therein.

The solder, made as above described, has solid and close molecular construction, very strong strength, and is of a high fusibility. Its fusing temperature is 230° C.–400° C. and as the content of cadmium increases, the fusing temperature decreases. After soldering an aluminium alloy (mainly duralumin) with the same or another aluminium alloy; metallic aluminium with metallic or an aluminium alloy; or metallic aluminium with any other metal etc. using this solder, the soldered parts are never injured by chemical action in contact with air and water. The operation of soldering can be carried out under far lower temperatures than usual and, therefore, the working is easier and the joint made is stronger than is customarily produced.

What is claimed is:

1. Alumino-solder containing 20–70% of zinc, 20–70% of tin, 5–35% of lead, 3–50% of cadmium, 1–5% of tin phosphide and 1–5% of magnesium, substantially as described., 2. The method of making alumino-solder, which consists in heating a quantity of tin at a temperature of 230° C., adding thereto a quantity of lead and tin phosphide, heating the mixture at a temperature of 330° C., adding a quantity of cadmium, zinc and magnesium, and continuing the heating of the mixture at a temperature of 420° C. until said mixture is fused.

MURAJI TORII.